United States Patent [19]
Konishi et al.

[11] Patent Number: 5,349,522
[45] Date of Patent: Sep. 20, 1994

[54] METHOD AND APPARATUS FOR CONTROLLING THE OUTPUT VOLTAGE OF AN AC ELECTRICAL SYSTEM

[75] Inventors: Hiroo Konishi, Katsuta; Hironari Kawazoe, Hitachi; Junzo Kawakami, Mito; Tomoharu Nakamura, Hitachioota; Yukio Tokiwa, Ichihara; Tatsuhito Nakajima, Tokyo, all of Japan

[73] Assignee: Hitachi, Ltd., Tokyo, Japan

[21] Appl. No.: 897,845

[22] Filed: Jun. 12, 1992

[30] Foreign Application Priority Data

Jun. 14, 1991 [JP] Japan .................................. 3-142967

[51] Int. Cl.$^5$ .................................. H02M 5/257
[52] U.S. Cl. .................................. 363/95; 363/17; 363/98; 323/205; 323/212
[58] Field of Search .................. 363/98, 17, 37, 132, 363/95; 323/205, 207, 212

[56] References Cited

U.S. PATENT DOCUMENTS

| | | | |
|---|---|---|---|
| 4,529,925 | 7/1985 | Tanaka et al. | 323/207 |
| 5,081,570 | 1/1992 | Chibani et al. | 363/17 |
| 5,136,494 | 8/1992 | Akagi et al. | 363/34 |
| 5,138,247 | 8/1992 | Tanoue et al. | 323/207 |
| 5,187,427 | 2/1993 | Erdman | 323/207 |

*Primary Examiner*—Steven L. Stephan
*Assistant Examiner*—Adolf Berhane
*Attorney, Agent, or Firm*—Antonelli, Terry, Stout & Kraus

[57] ABSTRACT

An AC system having, for example, a voltage source, an inductance and a load has connected thereto an apparatus for controlling the phase and amplitude of the voltage of the system. The instantaneous current and voltage in the AC electrical system are measured and power measurements derived therefrom. The power measurements may be instantaneous real and imaginary power, instantaneous active and reactive power, or active and reactive power averaged over less than one cycle. The power measurements are then used to derive phase related control values, on the basis of which control signals are generated to a converter. The action of the converter in accordance with the control signals thus controls the amplitude and phase of the voltage. By use of power measurements, it is not necessary to measure the phase of the voltage of the AC system.

10 Claims, 3 Drawing Sheets

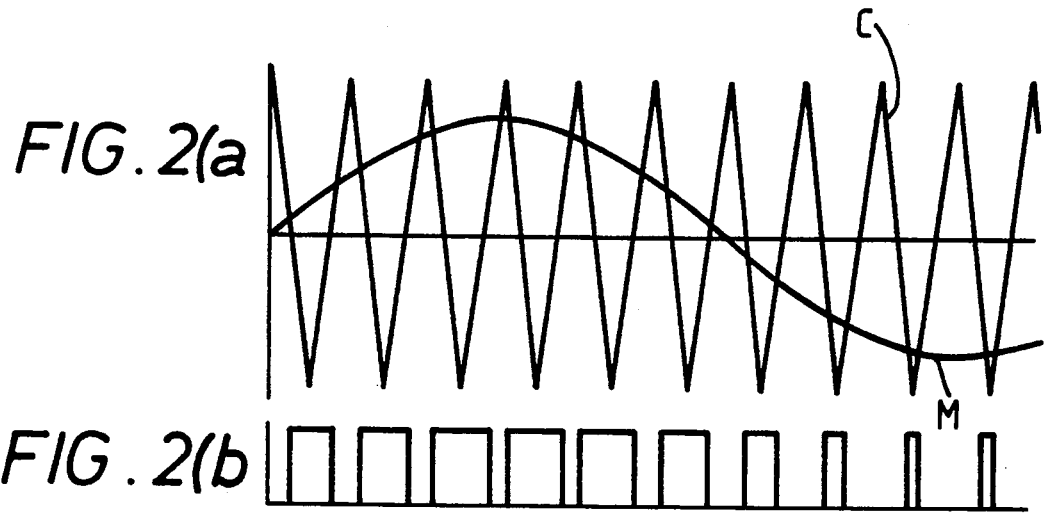
FIG. 2(a)
FIG. 2(b)
FIG. 3
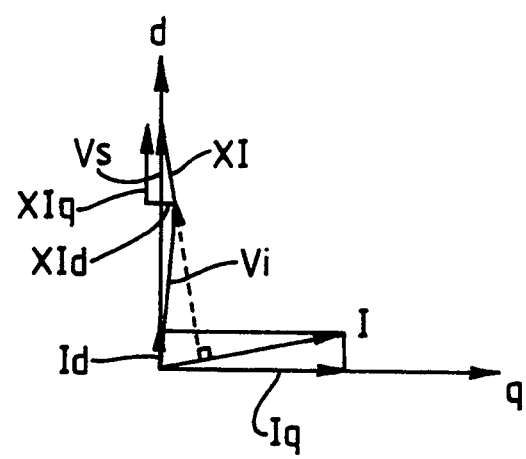

METHOD AND APPARATUS FOR CONTROLLING THE OUTPUT VOLTAGE OF AN AC ELECTRICAL SYSTEM

BACKGROUND OF THE INVENTION

1. Field of the Invention

The present invention relates to control of the output voltage of an AC electrical system by means of a converter connected to that system. The present invention is particularly, but not exclusively, concerned with output voltage control in a power control system.

2. Summary of the Prior Art

Consideration has been given to the control of power equipment using a self-commutated converter. Such a converter controls the leading or lagging of reactive power, thereby to control the amplitude and phase of the output voltage of the AC power system. In such an arrangement, it is necessary to provide a control apparatus which monitors current values in the AC power system and provides appropriate control of the converter.

FIG. 1 of the accompanying drawings shows an AC power system to which is connected a known control apparatus having means for monitoring current values in the AC system and an inverter for controlling the amplitude and phase of the output. The resultant structure thus defines an AC electrical system.

In the system shown in FIG. 1, an AC power source 1 is connected via an impedance 2 to a load 3. A capacitor 41 is connected to the DC side of an inverter 42. The inverter 42 is a voltage type self-commutated inverter (converter) comprising switching elements 4201 to 4206 having a self-commutating function. The switching elements 4201 to 4206 may be, for example, gate turn-off thyristors (GTO). Diodes 4207 to 4209 and 4211 to 4213 are connected to the switching elements 4201 to 4206 in anti-parallel. A transformer 43 connects the inverter 42 to the AC system formed by source 1, impedance 2 and load 3. The capacitor 41, inverter 42 and transformer 43 form a reactive power compensator.

The reactive power compensator thus formed is controlled by control units 410 to 423. An AC detection circuit (ACD) 410 detects three-phase alternating currents Iu, Iv, Iw at the connection of the reactive power compensator to the AC system, and a first transforming circuit (TRANS) 411 transforms the three-phase alternating currents Iu, Iv and Iw to two-phase alternating currents Ia, Ib of fixed coordinates, according to Equation 1 below.

$$\begin{bmatrix} Ia \\ Ib \end{bmatrix} = \begin{bmatrix} 1, & -1/2, & -1/2 \\ 0, & \sqrt{3}/2, & \sqrt{3}/2 \end{bmatrix} \begin{bmatrix} Iu \\ Iv \\ Iw \end{bmatrix} \quad \text{(Equation 1)}$$

A second transforming circuit (TRANS) 412 transforms the currents Ia, Ib from Equation 1 to direct current signals on axes d and q of co-ordinates according to Equation 2 below, using the voltage phase angle $\theta$ ($=107$ t, $\omega=2\pi f$) of the AC system.

$$\begin{bmatrix} Id \\ Iq \end{bmatrix} = \begin{bmatrix} \sin\theta & -\cos\theta \\ \cos\theta & -\sin\theta \end{bmatrix} \begin{bmatrix} Ia \\ Ib \end{bmatrix} \quad \text{(Equation 2)}$$

A first adder (ADD) 413 derives the difference between a current command value Iqp in the q axis and the direct current signal Iq of Equation 2, which is transformed by the second transforming circuit 412. An operational amplifier (AMP) 414 then amplifies the difference derived from the first adder 413. A multiplier (MULT) 415 multiplies the direct current signal Id of Equation 2, which is transformed by the second conversion circuit 412, by the impedance of the transformer 43. A second adder (ADD) 416 subtracts the output of the operation amplifier 414 from the output of the multiplier 415.

A third adder (ADD) 417 derives the difference between a current command value Idp in the d axis and the direct current signal Id, from the second transforming circuit 412. An operational amplifier (AMP) 418 then amplifies that difference. A multiplier (MULT) 419 multiplies the direct current signal Iq, which is transformed by the second transforming circuit 412, by the impedance of the transformer 43. A fourth adder (ADD) 420 subtracts the output of the operational amplifier 418 and the output of the multiplier 419 from a bias signal Vs.

The outputs of adders 416, 420 are fed to a phase angle calculation circuit (PHASE CALC) 412 which derives a command value for the phase angle $\delta$ of the output voltage of the inverter 42. In a similar way, the outputs of the adders 416, 420 are fed to an amplitude calculation circuit (AMP CALC) 422 for calculating a command signal k for the amplitude of the output voltage of the inverter 42. Those control signals are fed to a pulse width modulation waveform generating circuit (PWM) which generates control pulses to the switching elements 4201 to 4206 of the inverter 42 so as to generate an output from the reactive power compensator which gives appropriate control of the phase and amplitude of the voltage of the AC system.

The operation of the PWM 423 will now be discussed in more detail with reference to FIGS. 2(a) and 2(b). FIG. 2(a) shows a carrier waveform C and a modulated waveform M, and FIG. 2(b) shows switching element control pulses. Those pulses have a value of "1" when the modulated waveform M is greater than the carrier waveform C, and have a value of "0" when the modulated waveform M is less than the carrier waveform C. When the control pulse has a value of "1" the switching element 4201 (or element 4203, or element 4205) is turned on and the switching element 4202 (or element 4204, or element 4206) is turned off. When the control pulse is "0", the switching element 4201 (or element 4203, or element 4205) is turned off on the switching element 4202 (or element 4204 or element 4206) is turned on.

When the amplitude of the command signal k increases, the amplitude of the modulated waveform M increases. As a result, the pulse width of the pulses of FIG. 2(b) increases and hence the AC output voltage of the inverter 42 increases. In a similar way, when the amplitude k of the command signal decreases, the output voltage of the inverter 42 decreases. The signal $\delta$ representing the phase angle corresponds to the phase angle of the output voltage of the inverter 42 relative to the AC system voltage, and also to the phase angle of the carrier waveform C and modulated waveform M. The reactive power of the reactive power compensator can be obtained by controlling the amplitude of the command signal k when the AC voltage is kept at a constant value. By increasing the value of signal k, leading reactive power is controlled, and by decreasing lagging reactive power is controlled.

The effect of the control achieved by the system of FIG. 1 will now be discussed with reference to FIG. 3, which shows a voltage and current vector diagram. FIG. 3 illustrates the case where a lagging current flows through the reactive power compensator. In FIG. 3, the vectors shown by arrows are as follows:

Vi: The output voltage of the inverter 42
I: Current
X: Impedance
Vs: The voltage of the AC system In FIG. 3, the direction of the d axis is the same of that of the system voltage Vs, so that the direction of the q axis lags by 90 electrical degree relative to the d axis. The inverter voltage Vi is expressed by Equation 3 below, referring to the d and q axis signals.

$$|Vi| = \sqrt{(Vs - X \cdot Iq)(Vs - X \cdot Iq) + (X \cdot Id)(X \cdot Id)}$$
$$\delta = -\text{Arctan}\{(X \cdot Id)/(Vs - XIq)\}$$

(Equation 3)

Thus, the phase calculation circuit 421 and the amplitude calculation circuit 422 command values on the basis of Vi and δ of Equation 3, to create appropriate control signals to the PWM 423. The control devices 413 to 416 control the command values for the component in the q axis and the control devices 417 to 420 control the command values for components in the d axis. Vs is equivalent to the AC system voltage and the values Iqp and Idp are command values of Iq and Id in FIG. 3.

Thus, the currents are decomposed into components in the d axis and the q axis respectively, so that those components can be controlled independently and it is possible to control the currents to a suitable target value, with a high speed of operation. Such control is discussed in more detail in the article by Y Tokiwa et al. entitled "Application of a digital instantaneous current control for static induction thyristor converters in the utility line" published in PCIM 1988 Proceedings.

SUMMARY OF THE PRESENT INVENTION

In the known system, discussed above, use is made of the signal representing the phase angle of the voltage of the AC system. This is used to transform the direct current signals, and must be detected from the AC system. The necessity for this measurement derives directly from Equation 2, and thus is fundamental to the known method of control.

However, the accuracy and speed of response of the system is then fully dependent on the detection accuracy of the phase angle θ, and it has proved difficult to achieve such accuracy.

Therefore, the present invention seeks to provide control which is independent of measurement of the phase angle of the AC system. Instead of using that phase angle, voltage values are derived from the AC system in addition to the derivation of current values, and the current and voltage values are used to derive power measurements, which are then used to derive control signals. By use of power measurements, it is possible to avoid the need for measurement of the phase angle, and hence the speed and accuracy of the control system may be improved.

In the present invention, the power measurements relate to less than one cycle of the AC electrical system. Indeed, the power measurements are preferably instantaneous (as are the measurements of the current and voltage values of the AC system) like the power measurements are real and imaginary power (which terms are to be discussed in more detail later) it is straight forward to derive instantaneous power measurements from measurement of values of the magnitude of the instantaneous current and voltage in the AC electrical system. Where the power measurements are active and reactive power, (again, these terms will be discussed in more detail later) it is more difficult to make use of instantaneous measurement and therefore it may be necessary to measure over a part of one cycle, and average the measurements.

The present invention relates to a method of controlling the output voltage of an AC electrical system, to a control device for carrying out such a method, and to an AC electrical system incorporating such a control device.

BRIEF DESCRIPTION OF THE DRAWINGS

An embodiment of the present invention will now be described in detail, by way of example, with reference to the accompanying drawings in which:

FIG. 2(a) and 2(b) are graphs showing the operation of the pulse width modulation waveform generating circuit of FIG. 1;

FIG. 3 is a voltage and current vector diagram for explaining the operation of the system of FIG. 2.

DETAILED DESCRIPTION

Before discussing embodiments of the present invention, the concept of real and imaginary power will be discussed in more detail.

In the first embodiment of the present invention to be discussed later, instantaneous current and voltage measurements from the AC side of the converter (inverter) are obtained, to derive instantaneous real power and instantaneous imaginary power, and then use is made of the instantaneous real power and instantaneous imaginary power to obtain a real current and an imaginary current, and controls the amplitude and phase of the output voltage of the converter on the basis of the real current and imaginary current so derived.

Assume that the AC voltages of the converter are Vu, Vv, and Vw and the alternating currents are Iu, Iv, and Iw. Then, using those voltages and currents, values Va, Vb, Ia and Ib are obtained as signals so that three-phase alternating currents are transformed to two-phase alternating currents, using Equation 1. Then instantaneous real power Wd and instantaneous imaginary power Wq are calculated from Equation 4 below using the above values. For further definitions of the concepts of real and imaginary power, see the article by H Akagi et al entitled "Generalization theory of instantaneous reactive power and its application", published in the Transactions of the Institute of Electrical Engineers of Japan, Vol 103 B, pp. 483 to 490, July, 1983.

$$Wd = Va \cdot Ia + Vb \cdot Ib$$

$$Wq = Va \cdot Ib - Vb \cdot Ia \qquad \text{(Equation 4)}$$

Assuming that the magnitude of AC voltage of the AC system is Vs, therefore, a real current signal id and an imaginary current signal iq may be calculated from the following equations.

$$id = Wd/Vs$$

$$iq = Wq/Vs \quad \text{(Equation 5)}$$

The calculated values of id and iq and the values of Id and Iq obtained from Equation 2 are related as follows.

$$id \approx Id$$

$$iq \approx Iq \quad \text{(Equation 6)}$$

Therefore, instantaneous real power and instantaneous imaginary power may be obtained from the AC voltage and current of the converter, and instantaneous real current and an instantaneous imaginary current (id and iq) are obtained from the instantaneous real power and instantaneous imaginary power on the basis of the magnitude of the AC voltage. Hence, the amplitude and phase of the output voltage of the converter can be controlled on the basis of the values of id and iq. As a result, a control system and method can be achieved which responds rapidly, and permits stable operation, without detecting the phase angle of the voltage of the AC system.

Figure 1:
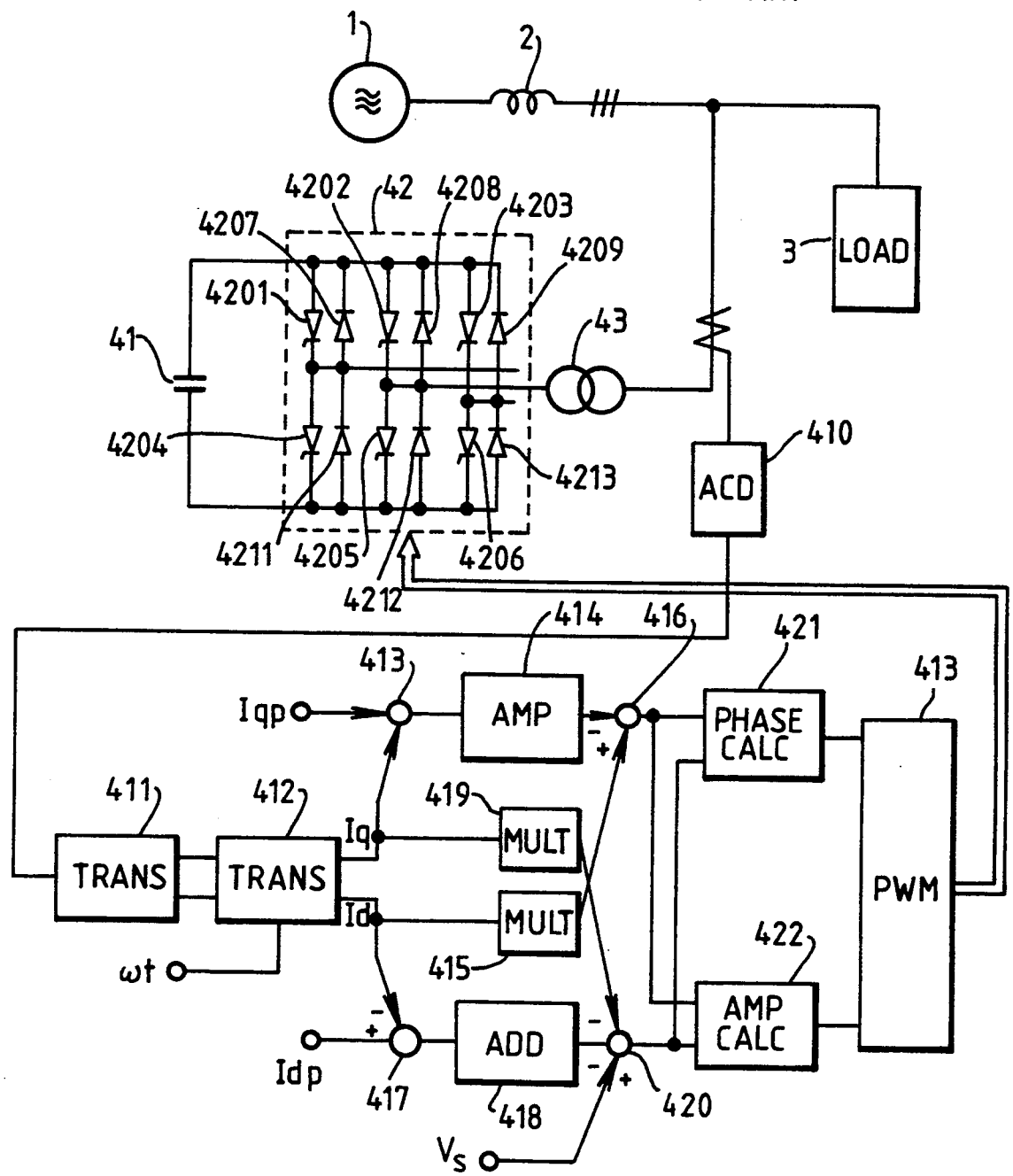
FIG. 1 is a schematic block diagram of an AC power system incorporating a control apparatus with a known circuit for controlling a reactive power compensator, and has already been discussed.
Figure 4:
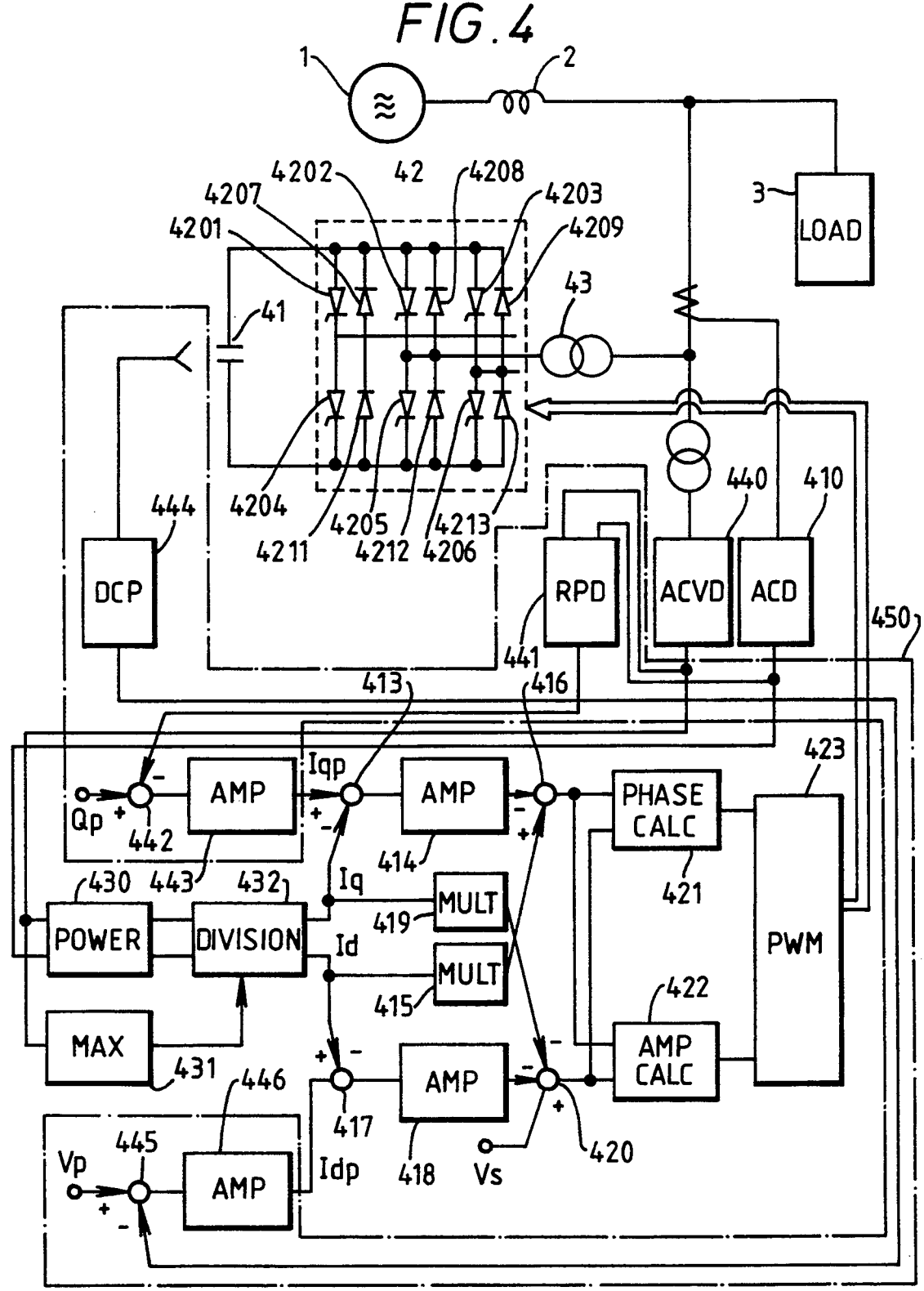
FIG. 4 is a schematic block diagram of an AC power system incorporating the present invention.

An embodiment of the present invention will now be described in detail with reference to FIG. 4. The known system described with reference to FIGS. 1 to 3 is modified only insofar as it is necessary to avoid measurement of the phase angle, and to make use of power measurements. Therefore, many components of the embodiment of FIG. 4 are the same or similar to those of FIG. 1 and are indicated by the same reference numerals. Such components will not be described in detail.

It can be seen that, in addition to the alternating current detection circuit (ACD) 410, which detects the three-phase alternating currents Iu, Iv and Iw of the reactive power compensator, there is also an AC voltage detection circuit (ACVD) 440 for detecting three-phase voltages Vu, Vv, and Vw at the connection of the reactive power compensator to the AC system. A power calculation circuit (POWER) 430 calculates instantaneous real power and instantaneous imaginary power from the detected three-phase AC voltages and three-phase alternating currents Iu, Iv, and Iw, using Equations 1 and 4. A maximum value detection circuit (MAX) 431 detects the maximum amplitude (maximum of the absolute values of the AC voltages) of the three-phase AC voltages from the detected AC voltages, and a division circuit (DIVISION) 432 divides the calculated results of instantaneous real power and instantaneous imaginary power by the magnitude of the detected AC voltage maximum amplitude.

The resultant imaginary current signal iq (since iq is equivalent to Iq from Equation 6, the subsequent description will refer to Iq) is input to the first adder 413 and the difference between Iq and the current command value Iqp in the q axis is obtained. This difference is amplified by the operational amplifier 414. Similarly, a real current signal id (since id is equivalent to Id from Equation 6, the subsequent description will refer to Id) obtained from the division circuit 432 is input to the multiplier 415 and multiplied by the impedance of the transformer 43. The second adder 416 subtracts the output of the operational amplifier 414 from the output of the multiplier 415, the third adder 417 obtains the difference between the current command value Idp in the d axis and the current Id from by the division circuit 432, and the difference is amplified by the operational amplifier 418. The multiplier 419 multiplies the current Iq obtained by the division circuit 432 by the impedance of the transformer 43, and the fourth adder 420 subtracts the output of the operational amplifier 418 and the output of the multiplier 419 from the bias signal Vs.

The phase angle calculation circuit 421 calculates the command value δ for the PWM 423 from the output values of the adders 416 and 420 and the amplitude calculation circuit 422 calculates the command value k for the PWM 423 from the output values of the adders 416 and 420, using Equation 3.

The PWM 423 generates control pulses to the switching elements 4201 to 4206 so as to obtain an output voltage of the inverter 42 having substantially the above phase and amplitude, on the basis of the output commands δ and k of the phase angle calculation circuit 421 and the amplitude calculation circuit 422 and the reactive power is controlled by those pulses. Hence, according to this embodiment, there is no need to detect the phase angle of the voltage of the AC system and a rapid response control system can be obtained.

From the description above, it can be seen that the values Id and Iq are obtained by calculating instantaneous real power and instantaneous imaginary power from the AC voltage and alternating current of the AC system and dividing those values by the detected magnitude of the AC voltage.

When the reactive power and the active power of the AC system can be detected at a high speed, it is clear that equivalents to Id and Iq may be obtained by dividing those values by the magnitude of the AC voltage in the same way as above because when the AC system is in a symmetrical and equilibrium state, the instantaneous real power is equal to the active power and the instantaneous imaginary power is equal to the reactive power.

The above principles can be applied to a general control unit for a self-commutated converter or inverter.

The above description has not discussed the structure of the part of the embodiment of FIG. 4 enclosed by dotted lines, and indicated by the reference numeral 450. That part 450 of the embodiment will now be described in more detail. The part 450 is concerned with measurements using active and reactive power.

In the part 450, a reactive power detection circuit (RPD) 441 detects the reactive power from the values detected by the alternating current detection circuit 410 and the AC voltage detection circuit 440 mentioned above. A fifth adder (ADD) 442 derives the difference between a reference value Qp for the reactive power and the detected value of reactive power, and an operational amplifier (AMP) 443 amplifies this difference. The fifth adder 442 and the operational amplifier 443 form a reactive power constant control circuit. The output of the operational amplifier 443 is used as the command value Iqp for q axis control.

A DC voltage detection circuit (DCD) 444 detects the voltage of the capacitor 41, and a sixth adder (ADD) 445 derives the difference between a reference value Vp for the DC voltage and the detected value of the DC voltage, and an operational amplifier (AMP)

446 amplifies this difference. The sixth adder 445 and the operational amplifier 446 form a DC voltage constant control circuit. The output of the operational amplifier 446 is used on the command value Idp for d axis control.

When the DC voltage of the capacitor 41 is reduced below the reference value Vp, the output of the sixth adder 445 becomes positive and the value of Idp becomes positive. When the operational amplifier 418 has an integral function, the amplitude and phase of the inverter AC output voltage are controlled so that Id and Idp coincide with each other and are stationary. Similar behavior occurs when the reactive power is different from the reference value Qp. When the reactive power is higher than the reference value Qp, the output of the fifth adder 442 is negative and the value of Iqp is negative. When the operational amplifier 414 has an integral function, the amplitude and phase of the inverter output voltage are controlled so that Iq and Iqp coincide with each other and are static. By doing this, the reactive power and DC voltage coincide with the reference values Qp and Vp respectively. This circuit construction enables the reactive power to be controlled to the reference value Qp at a high speed when the capacitor voltage is kept constant.

In the same way, instantaneous power (discussed above) can be used instead of the detected reactive power.

Furthermore, in another embodiment of the present invention, a reactive power compensator which is connected to a secondary battery such as a sodium sulphur battery may be used, with the battery replacing the capacitor 41 on the DC side of the inverter 42 shown in FIG. 4 (the part 450 is omitted). In this case, when the energy of the secondary battery is valid, not only the reactive power but also the active power can be output and the battery plays a role which is the same as that of a generator for the system. Such an embodiment permits both the reactive power and the active power to be controlled at a high speed.

Furthermore, in another embodiment of the present invention, a control unit utilizing the principles of the present invention discussed above can be easily applied to an inverter control system for an inverter driving motor. In this case, a transformer (converter) for a rectifier for generating a DC voltage on the inverter DC side, an inverter, an inverter transformer, and a motor are added to the construction shown in FIG. 4 (the part 450 is omitted). By providing command values in the d and q axes in dependence on the number of revolutions of the motor and the torque, a motor with stable control characteristics including rapid response can be obtained.

Another embodiment of the present invention relates to the use of a control unit for converter control for an inverter driving motor. In this case, by providing a command signal of reactive power for q axis control and the command value of the DC output voltage for d axis control, the power factor of the converter can be set to 1 and a motor driving unit with good control characteristics, including a rapid response can be obtained.

What is claimed is:

1. A method of controlling the amplitude and phase of the voltage of an AC electrical system, said AC electrical system having a converter, said method comprising:

measuring instantaneous current and voltage magnitude values in said AC electrical system;

deriving power measurements from said instantaneous current and voltage magnitude values, said power measurements relating to less than one cycle of said AC electrical system, wherein said power measurements are an instantaneous real power and an instantaneous imaginary power;

deriving, from said power measurements, phase-related control values, wherein said phase-related control values are a phase-related real current control value obtained from the instantaneous real power divided by the instantaneous voltage magnitude and a phase-related imaginary current control value obtained from the instantaneous imaginary power divided by the instantaneous voltage magnitude;

generating control signals for said converter from said phase-related control values; and controlling said converter on the basis of said control signals, thereby to control said amplitude and phase of said voltage of said AC electrical system.

2. A method according to claim 1, wherein said control signals include an amplitude control signal, which amplitude control signal is proportional to the square root of the sum of the squares of said phase-related real current control value and said phase-related imaginary current control value.

3. A method according to claim 1, wherein said control signals include a phase control signal, which phase control signal is proportional to the arc tangent of the ratio of said phase-related real current control value and said phase related imaginary current control value.

4. A method according to claim 1, wherein said power measurements include an instantaneous active power and an instantaneous reactive power.

5. A method according to claim 1 wherein said power measurements include active and reactive power averaged over less than one cycle.

6. A control device for controlling the amplitude and phase of the voltage of an AC electric system, said device comprising:

a converter for said AC electrical system;

means for detecting instantaneous current and voltage magnitude values in said AC electrical system;

means for deriving power measurements from said instantaneous current and voltage values, said power measurements relating to less than one cycle of said AC electrical system;

means for deriving phase-related control values from said power measurements, wherein said power measurements are an instantaneous real power and an instantaneous imaginary power and said phase-related control values are a phase-related real current control value obtained from the instantaneous real power divided by the instantaneous voltage magnitude and a phase-related imaginary current control value obtained from the instantaneous imaginary power divided by the instantaneous voltage magnitude;

a controller for controlling said converter on the basis of said control signals, thereby to control the amplitude and phase of said voltage of said AC electrical system.

7. A control device according to claim 6, wherein said converter is an inverter.

8. A control device according to claim 6, wherein said means for deriving power measurements includes means for deriving an instantaneous active power and means for deriving an instantaneous reactive power.

9. A control device according to claim 6, wherein said means for deriving power measurements includes means for deriving an active power arranged over less than one cycle of said AC electrical system and means for deriving an reactive power averaged over less than one cycle of said AC electrical system.

10. An AC electrical system in which the amplitude and phase of the voltage thereof is controllable, said system comprising means for generating an AC signal, and a device for modifying said AC signal, thereby to control said voltage;

wherein said device comprises:

a converter connectable to said AC electrical system;

means for detecting instantaneous current and voltage magnitude values in said AC electrical system;

means for deriving power measurements from sid instantaneous current and voltage values, said power measurements relating to less than one cycle of said AC electrical signal, wherein said power measurements are an instantaneous real power and an instantaneous imaginary power;

means for deriving phase-related control values from said power measurements, wherein said phase-related control values are a phase-related real current control value obtained from the instantaneous real power divided by the instantaneous voltage magnitude and a phase-related imaginary current control value obtained from the instantaneous imaginary power divided by the instantaneous voltage magnitude; and a controller for controlling said converter on the basis of said control values, thereby to control the amplitude and phase of said voltage of said AC electrical system.

* * * * *

UNITED STATES PATENT AND TRADEMARK OFFICE
CERTIFICATE OF CORRECTION

PATENT NO. : 5,349,522
DATED : Sep. 20, 1994
INVENTOR(S) : KONISHI et al

It is certified that error appears in the above-identified patent and that said Letters Patent is hereby corrected as shown below:

Title page, should read--
[73] Assignee: Hitachi, Ltd & The Tokyo Electric Power Company, Inc., both of Tokyo, Japan --

Signed and Sealed this

Fourteenth Day of February, 1995

Attest:

BRUCE LEHMAN

Attesting Officer

Commissioner of Patents and Trademarks